A. A. MARTELL.
MOVABLE ZERO SCALE FOR REAMERS AND THE LIKE.
APPLICATION FILED FEB. 1, 1918.

1,382,843.

Patented June 28, 1921.
2 SHEETS—SHEET 1.

INVENTOR
Albert A. Martell
BY
Ramsey & Parmelee
ATTORNEY

A. A. MARTELL.
MOVABLE ZERO SCALE FOR REAMERS AND THE LIKE.
APPLICATION FILED FEB. 1, 1918.

1,382,843.

Patented June 28, 1921.
2 SHEETS—SHEET 2.

INVENTOR
Albert A. Martell
BY
Ramsey & Parmelee
ATTORNEYS

UNITED STATES PATENT OFFICE.

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

MOVABLE ZERO-SCALE FOR REAMERS AND THE LIKE.

1,382,843.     Specification of Letters Patent.    Patented June 28, 1921.

Application filed February 1, 1918. Serial No. 214,855.

*To all whom it may concern:*

Be it known that I, ALBERT A. MARTELL, a citizen of the United States, residing at Woonsocket, in the county of Providence, State of Rhode Island, have invented certain new and useful Improvements in Movable Zero-Scales for Reamers and the like, of which the following is a specification.

This invention relates broadly to small tools and the like, and more particularly to a reamer provided with a micrometer scale coöperating with an adjustable zero scale piece whereby accommodation is made for adjustment of the scales to at all times agree with the point of departure from which the blades are to be adjusted.

The principal object of the present invention is to provide a reamer wherein the zero point from which the micrometer scale is read may be adjusted after the reamer blades have been ground so that the scale reads accurately to predetermined dimensions without the necessity of grinding the blades to the said dimensions.

Another and equally important object of the present invention is the method of coordinating the zero portion of the micrometer scale on reamers and the like, with a predetermined dimension to which the reamer blades are set; which consists in calibrating the reamer blades to the predetermined dimension; then moving the zero scale plate or departure plate until the zero mark thereon corresponds to the zero mark on the micrometer scale; and then securing the zero departure scale in adjusted position.

A further object of the present invention comprises the providing of a reamer or the like with blades adapted to be adjusted radially to vary the effective size of the reamer in combined relation with an adjustable zero scale adapted to read in conjunction with the micrometer scale and whereby the zero scale may be moved to correct for grinding the reamer blades.

A further and equally important object of the present invention comprises a reamer head or the like, provided with a body portion and a ring movable longitudinally upon said body portion with a zero scale rotatably adjustable on said ring whereby said zero scale coöperates with the micrometer scale on a rotatable ring adapted to facilitate radial adjustments of the reamer blades, A still further object of the present invention comprises a reamer head or the like provided with a movable zero piece whereby the point of departure from which a micrometer scale is read may be adjusted circumferentially around a relatively stationary part of the reamer so as to facilitate the changing of the standard from which the micrometer scale is adapted to read.

Other and further objects of the present invention will in part be obvious and will in part be pointed out hereinafter in the specification following by reference to the accompanying drawings wherein like parts are indicated by like characters throughout the several figures thereof.

Figure 1:
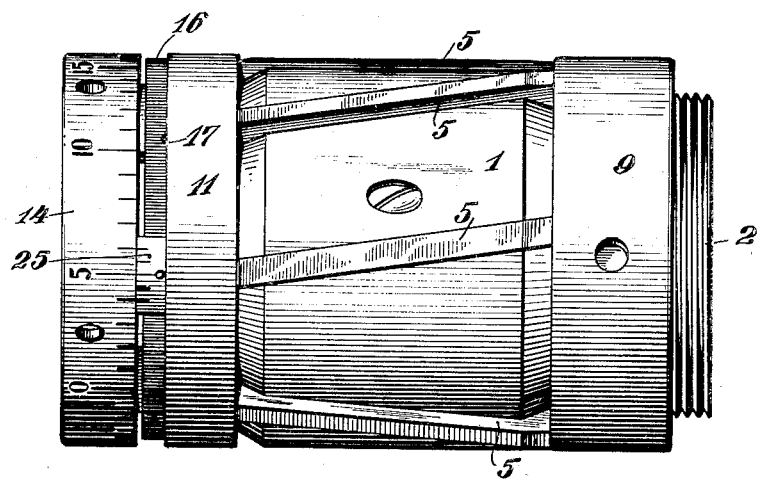
Figure 1 is a view illustrating an assembled reamer comprising the present invention.

It has heretofore been the custom in adjustable reamers and the like, provided with micrometer scales, to provide the zero or departure scale on a member which was nonrotative relatively to the body of the reamer, and then provide a movable or micrometer scale which rotated adjacent the zero or departure scale whereby rotation of the micrometer scale permitted the operator to determine the diameter of the cut of the reamer blades without necessity of calipering the reamer. In the prior known devices of this character it is necessary that the reamer blades be accurately ground so that when the zeros on the departure scale and on the micrometer scale are opposite, the maximum diameter of the reamer will be an exactly predetermined measure. This prior construction demands extreme nicety of measurements in making a reamer and if the parts should be accidentally ground under size it is necessary to make a complete rotative movement of the adjustment scale and then grind away a relatively large amount of the blades which are made from expensive tool steel. The same procedure is necessary where the blades are resharpened. In devices of this kind there is no intermediate zero position between relatively large adjustments. Furthermore, the zero position must be met absolutely, because there is no way in taking up a small variation either above or below the exact dimension.

The present invention contemplates the method whereby substantially any position within the maximum or minimum range of the caliper blade adjustments may be chosen as a zero point of departure so that in the original making of the reamer, or in subsequent regrinding of the reamer blades, all that is necessary is to grind the blades in such manner that the desired cutting edge is obtained and then adjust and caliper the reamer, and subsequently setting the departure zero opposite the zero on the micrometer scale and the departure point of predetermined diameter for the reamer is now determined. It is necessary that the departure or zero scale be fixedly held in position and in the present case that is accomplished by a construction wherein small knurled teeth are formed on the zero scale carrying member and on the zero scale. These teeth are so small relatively to the large intervals on the micrometer scale that the variation caused by adjustment from one tooth to another is substantially negligible. This method of adjustment may be carried out in various structures, one preferred form of which comprises a reamer of the character disclosed in my co-pending application Serial No. 179,191, filed July 7, 1917, wherein is shown a reamer comprising a body portion carrying wedge-shaped blade supports, with collars adapted to engage inclined ends of the blades whereby movement of the collars slides the blades on the wedge-shaped members thereby raising or lowering the blades on the body portion and thus increasing or decreasing the effective diameter of the reamer. The collar bearing immediately on one end of the blades is non-rotatable and slidable and comprises the member carrying the point of departure from which the micrometer scale on a threaded collar adjacent thereto is adapted to read, and the collar bearing on the other end of the blades is screw threaded.

In the present invention the non-rotative ring or collar is provided with a reduced portion having one edge undercut and being provided with spaced apart abutments adapted to contact with the scale carrying collar. The abutment edge of the slidable collar is also undercut and the reduced portion previously mentioned is knurled. A movable zero piece provided with a knurled portion on the underside is adapted to substantially fill out the cut-away portions on the slidable collar so that when the rotative scale carrying collar or ring is tightened against the slidable collar or ring the zero carrying piece is locked in position. By this construction it will be noted that the zero piece member may be adjusted rotatively around the slidable collar so that the point of departure may be changed in accordance with the previous method to desired positions on the non-rotatable slidable collar.

Figure 2:
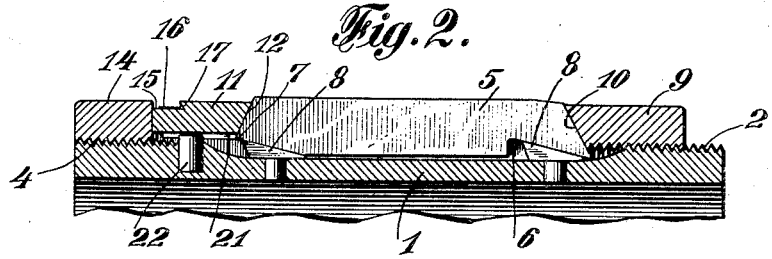
Fig. 2 is a detail view showing portions of the reamer in section whereby the radial adjustment of the blades is illustrated.
Figure 3:
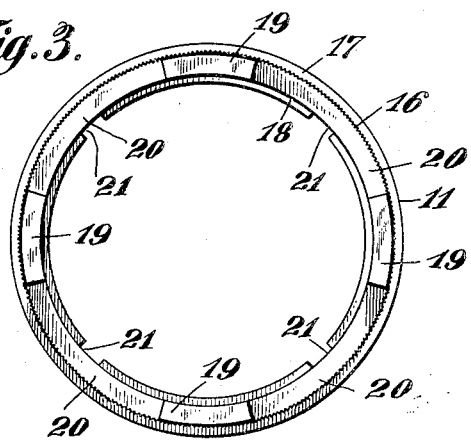
Fig. 3 is an end view of the carrying ring for the zero piece.
Figure 4:
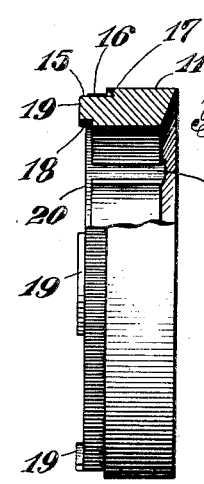
Fig. 4 is a side view of the carrying ring for the zero piece with a portion of the ring in section.
Figure 5:
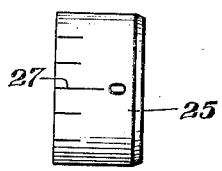
Fig. 5 is a top plan view of the movable zero piece.
Figure 6:
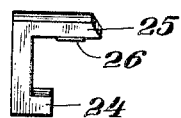
Fig. 6 is a side view of the movable zero piece.
Figure 7:
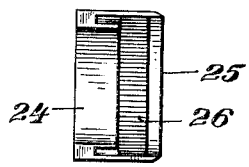
Fig. 7 is a bottom plan view of the movable zero piece.
Figure 8:
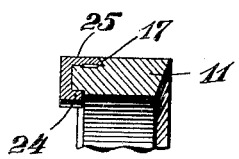
Fig. 8 is a detail view, in section, showing the relation between the movable zero piece and the carrying ring for the zero piece.
Figure 9:
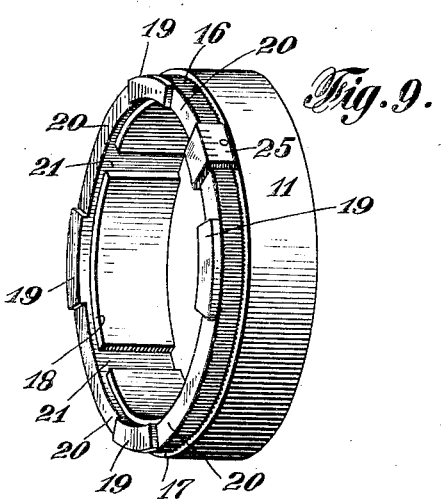
Fig. 9 is a perspective view showing the movable zero piece in position on the carrying ring for the zero piece.

Referring to the drawings and more particularly to Figs. 1, 2 and 9, the preferred construction embodying the present invention comprises a reamer body 1 screw threaded at the ends thereof, as at 2 and 4, and grooved to provide guideways for the reamer blades 5, which preferably are oppositely inclined to the axis of the body portion. The under portions of the reamer blades are inclined, as at 6 and 7, and rest upon the wedge-shaped blocks 8. A screw threaded collar 9 engages the screw threads 2 on the body portion and is undercut to coöperate with the inclined end 10 of the blades 5 and the non-rotatable slidable collar 11 coöperates with the other inclined end 12 of the reamer blades while the micrometer scale ring 14 forms an abutment to prevent outward endwise movement of the non-rotatable slidable collar 11 so that tightening the screw threaded collar 9 clamps the reamer blades tightly in position and by adjusting both the micrometer scale ring 14 and the screw threaded collar 9 the blades may be moved radially to predetermined positions within limits of the adjustable elements specified. In order to enable the operator to utilize any intermediate position of adjustment as a basis of calculations a movable zero scale or point of departure is provided, as has been previously explained. One form of construction for the movable zero departure scale comprises providing the non-rotatable collar 11 with a reduced portion 15 which carries a knurled or toothed zone 16. This collar is undercut, as at 17, adjacent the reduced portion, and is also undercut on the inner side, as at 18, to provide an overhanging part for purpose of supporting the zero or departure scale. The end of the slidable collar 11 which is adjacent the micrometer scale ring 14 is provided with a plurality of abutments 19 adapted to contact with the face on the end of the micrometer scale ring 14. Spaces 20 are provided between each of the abutments 19 and comprise passageways through which the zero scale member extends. In order to prevent rotation and insure slidable movement of the non-rotatable collar 11, the inner part thereof is provided with longitudinal grooves 21 that are adapted to slide over a stud 22 carried by the body portion 1 of the reamer.

The adjustable zero scale carrying member comprises a U-shaped device having a short ledge member 24 adapted to fit the undercut 18 on the inner side of the slidable collar 11, and with a longer ledge 25 provided with a beveled end and adapted to overlie the reduced portion 15 and fit within the undercut part 17 of the collar 11. This zero scale or departure member is toothed or knurled on the under portion of the longer ledge, as at 26. These teeth 26 engage the teeth 16 and effectively prevent rotative movement between the said zero scale member and the slidable collar 11. While one single mark to designate a zero or departure point would be sufficient on this member, it is preferably provided with a Vernier scale 27 on the upper surface of this movable zero member.

Figure 10:
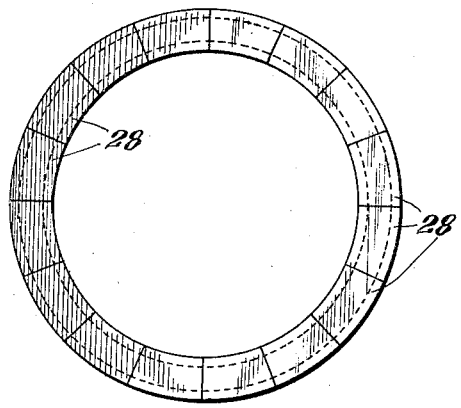
Fig. 10 illustrates the method which may be used in manufacturing the movable zero piece, by making a ring that is subsequently cut into individual parts or segments.
Figure 11:
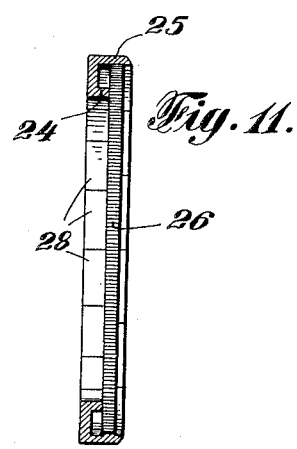
Fig. 11 illustrates one-half of the ring shown in Fig. 10.

In Figs. 10 and 11 are illustrated a convenient method of making these zero scale parts which comprises turning a ring or hollow cylinder of the conformation desired for the cross-section of the zero scale members, this ring is then knurled on the interior part and is then cut or sawed into segments 28, each of which comprises a zero scale member.

As has been previously explained, the reamer is assembled with the blades calibrated to a predetermined diameter which is to be the standard from which working dimensions are scaled, the position of the zero line on the micrometer scale is noted relatively to a point on the non-rotatable collar 11, and the micrometer scale ring is then loosened sufficiently to permit the zero scale member 28 to be positioned on the non-rotatable ring with the zero line thereon alined with the point noted on the collar 11. The reamer is now ready for use and as reamers of this character are frequently used to ream bearings for the crank shafts of automobile engines, it is merely necessary to caliper the crank shaft which is to be fitted to the bearing that is to be reamed and then adjust the micrometer on the reamer to the same reading as the caliper. When this is done and the bearing reamed it will exactly fit the portion in the crank shaft which is intended to operate in this particular bearing.

This invention may be carried out in structures other than the specific device herewith disclosed so therefore I desire that the disclosure in this application be considered as illustrative and not in the limiting sense.

Having thus described my invention what I claim is:

1. In a reamer or the like, in combination, a reamer body, adjustable blades carried by said reamer body, a non-rotatable ring slidable on the body of said reamer, an undercut portion on said non-rotatable ring, a departure scale member having a part adapted to fit the undercut portion, means to lock said departure scale member in predetermined adjusted positions relatively to said non-rotatable ring, and a rotative member provided with a micrometer scale adapted to read from the zero on said departure scale whereby the adjustment of said departure scale changes the point of departure relative to which said micrometer scale is adapted to read.

2. In a reamer or the like, in combination, a reamer body, adjustable blades carried by the reamer body, a non-rotatable ring slidable on said reamer body, said non-rotatable ring being provided both on the inner and outer part thereof with undercut portions, a U-shaped departure scale member adapted to fit the said undercut portions, means to lock said member in predetermined rotative positions relatively to the non-rotatable ring, and a micrometer scale carrying member adapted to be read relatively to the zero of the departure scale.

3. In a reamer or the like, in combination, a reamer body, cutting blades adjustably mounted upon said reamer body, a non-rotatable ring slidably mounted on said reamer body, said non-rotatable ring being provided with undercut portions on both the inner and outer parts thereof, a U-shaped departure scale carrying member adapted to fit said undercut portions, toothed members provided on said non-rotatable ring, toothed members on said departure scale carrying member and adapted to engage with the teeth on the said non-rotatable ring to lock said departure scale carrying member against rotative movement relatively to the said ring, and a micrometer scale carrying ring mounted to rotate adjacent the said non-rotatable ring.

4. In a reamer or the like, in combination, a reamer body, cutting blades adjustably mounted upon said reamer body, a non-rotatable ring slidably mounted on said reamer body, said non-rotatable ring being provided with an undercut portion adjacent one edge thereof, a departure scale carrying member constructed to fit said undercut portion, a series of teeth being formed on said non-rotatable ring adjacent said undercut portion, teeth formed on the under part of said scale carrying member and adapted to coöperate with the teeth on the non-rotatable ring, whereby said scale carrying member may be secured against rotation relatively to said non-rotatable ring, and a micrometer scale carrying member adapted to coöperate with said departure scale member to maintain said departure scale in adjusted positions.

5. In a reamer of the character described, in combination, a body portion, a plurality of blades adjustably mounted upon said body portion, devices for adjusting said blades radially, said devices comprising a non-rotatable collar mounted to abut against the ends of said blades, a rotatable screw threaded collar coöperating with the said non-rotatable collar and being provided with a micrometer scale, a departure scale circumferentially adjustable upon the said non-rotatable collar, and means to automatically lock the departure scale in adjusted positions.

6. In a reamer or the like, the combination of a reamer body, a plurality of cutting blades, means to adjust radially said cutting blades, a micrometer scale, an adjustable departure scale having a zero line from which said micrometer scale is adapted to be read, whereby the standard from which said micrometer scale reads is dependent upon the relative rotative position of said adjustable departure scale in relation to said reamer body, and positive locking means for the departure scale and automatic in operation when the adjustment means for the blades are effective.

7. In a reamer or the like, the combination of a body portion, adjustable blades mounted on said body portion, means to adjust said blades, a micrometer scale being provided upon certain of said means, and an adjustable departure scale being provided on certain other of said means, and a toothed seat against which said departure scale is automatically seated and locked when the blades are clamped in position after adjustment.

8. In a reamer, the combination of a body portion, a plurality of blades adjustably mounted on said body portion, a retaining collar coöperating with said blades, said collar being slidably mounted upon said body portion, a ledge upon said collar, an under-cut shoulder adjacent said ledge, a departure scale provided with a wedge-shaped portion adapted to fit said under-cut shoulder, and means to clamp said departure scale upon said ledge and with the wedge-shaped portion clamped in engagement with said under-cut portion.

9. In a reamer or the like, a micrometer provided with a movable departure scale comprising in combination, a scale support provided with a ledge, interlocking means provided on both said scale and said ledge whereby said scale may be retained in adjusted positions, and clamping means for securing said scale upon said ledge.

10. In a reamer or the like, a reamer body, adjustable blades carried by said reamer body, a non-rotatable ring slidable on said body and coöperating with said blades to adjust the same, a rotatable clamping ring adapted to compress said non-rotatable ring against the ends of said blades, and a departure scale having a portion extending between said non-rotatable ring and said rotatable ring in such manner that when said rotatable ring is set against said non-rotatable ring the departure scale is clamped in adjusted position.

ALBERT A. MARTELL.